Aug. 17, 1926.

G. C. MARTIN 1,596,203

PIPE MAKING MACHINE

Filed Jan. 21, 1924     5 Sheets-Sheet 1

INVENTOR.
George C. Martin;
BY
Blakeslee & Brown
ATTORNEYS.

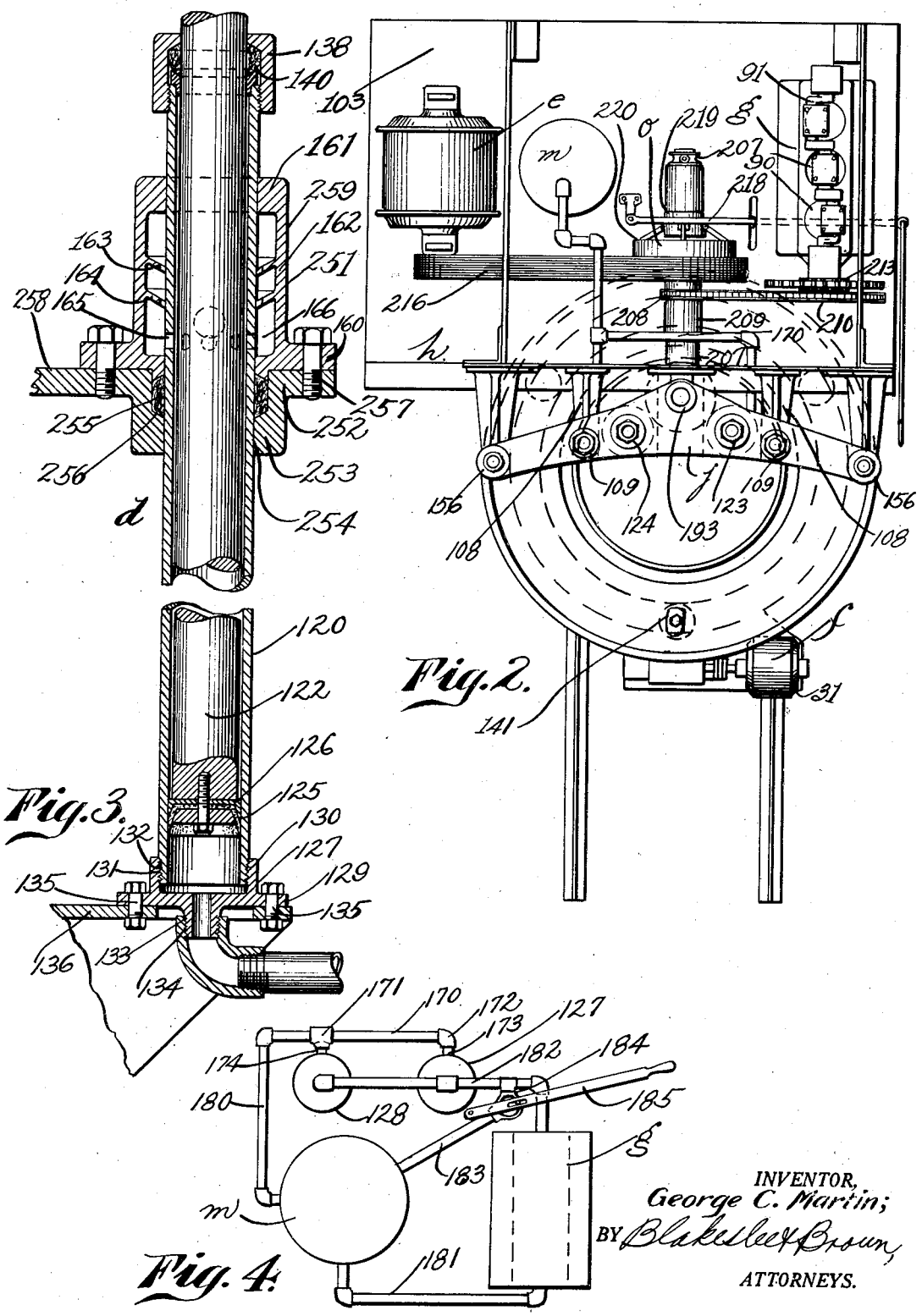

Aug. 17, 1926.
G. C. MARTIN
1,596,203
PIPE MAKING MACHINE
Filed Jan. 21, 1924   5 Sheets-Sheet 3
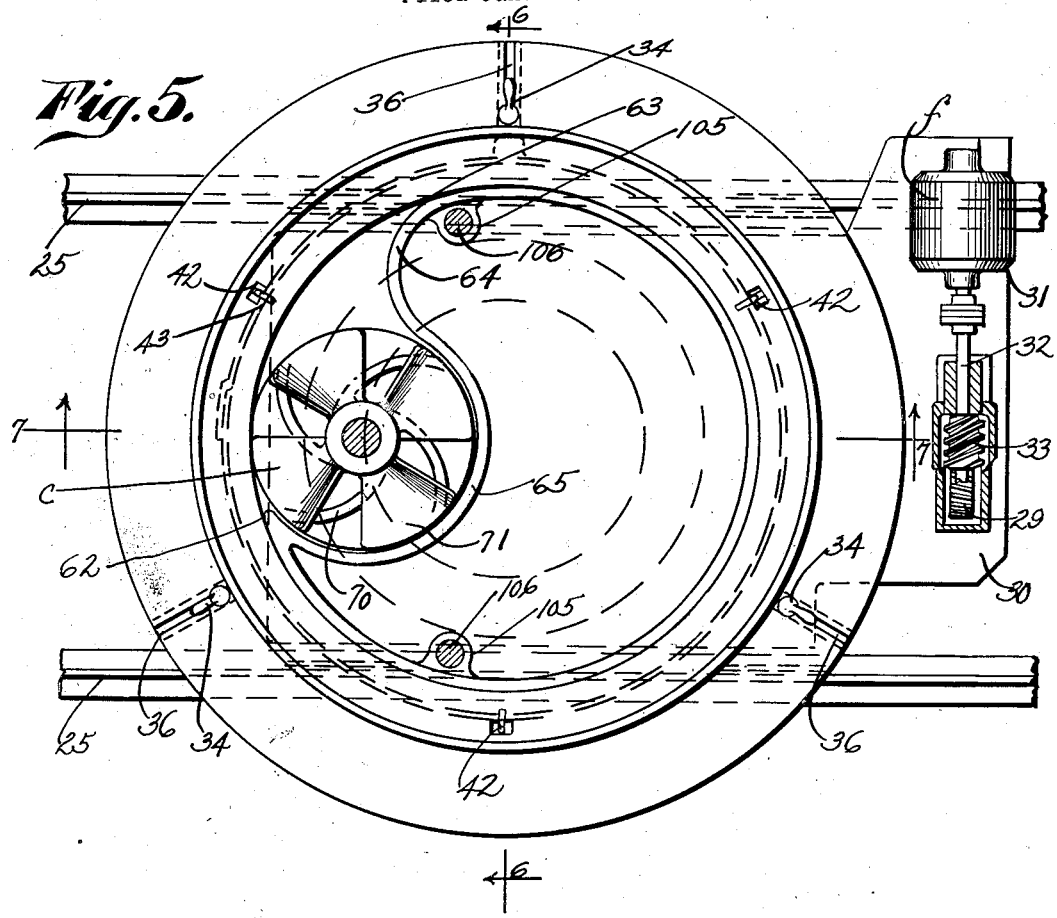
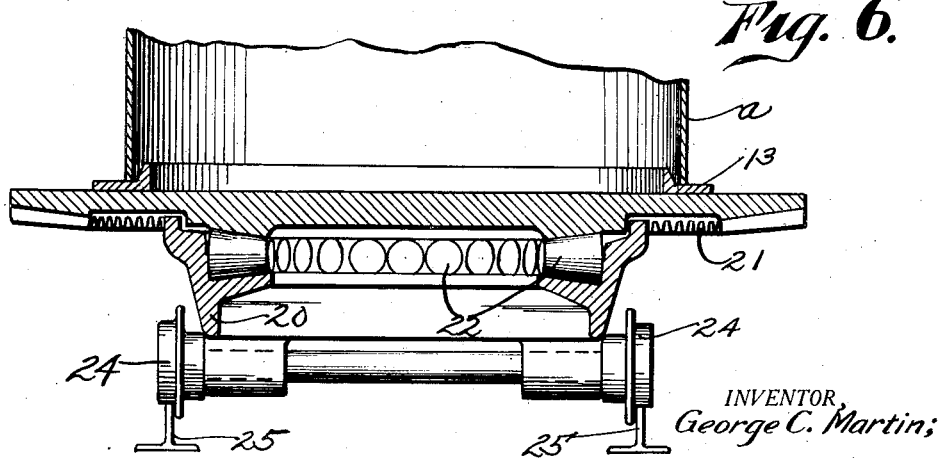
INVENTOR
George C. Martin;
BY
Blakeslee & Brown
ATTORNEYS.

Aug. 17, 1926. 1,596,203
G. C. MARTIN
PIPE MAKING MACHINE
Filed Jan. 21, 1924   5 Sheets-Sheet 4
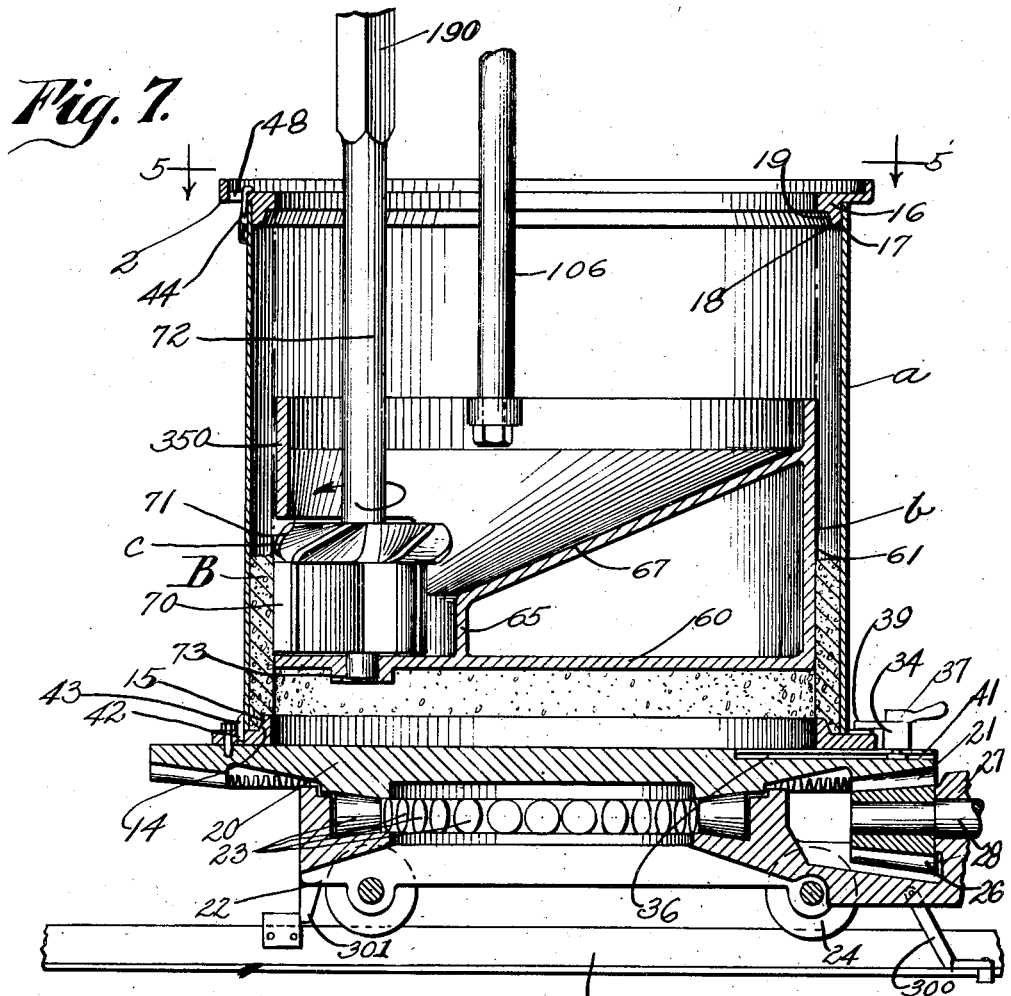
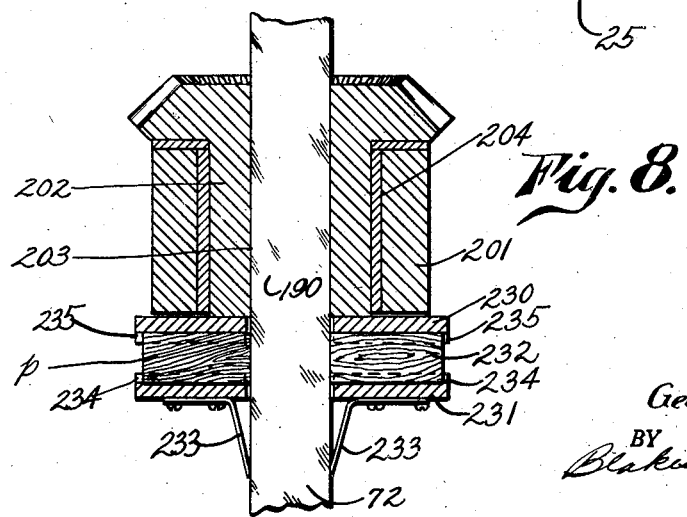
INVENTOR.
George C. Martin;
BY
Blakeslee & Brown
ATTORNEYS.

Aug. 17, 1926.  
G. C. MARTIN  
PIPE MAKING MACHINE  
Filed Jan. 21, 1924  
1,596,203  
5 Sheets-Sheet 5
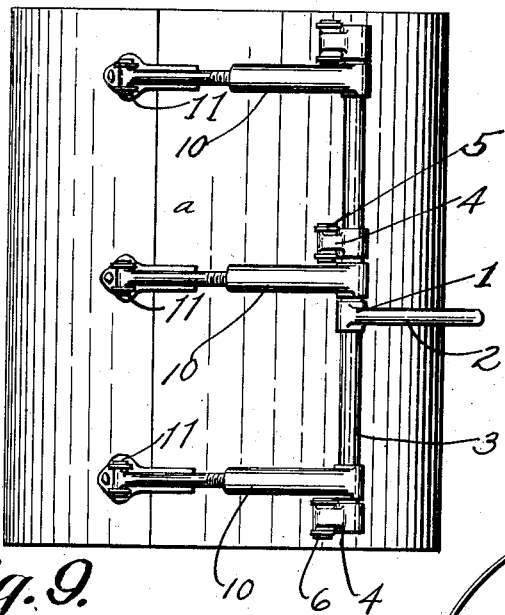
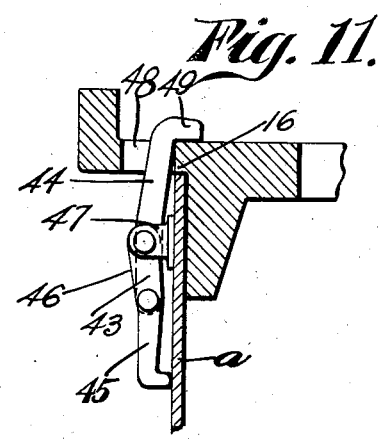
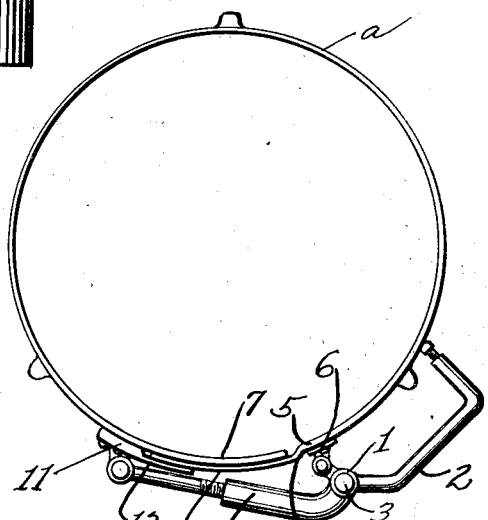
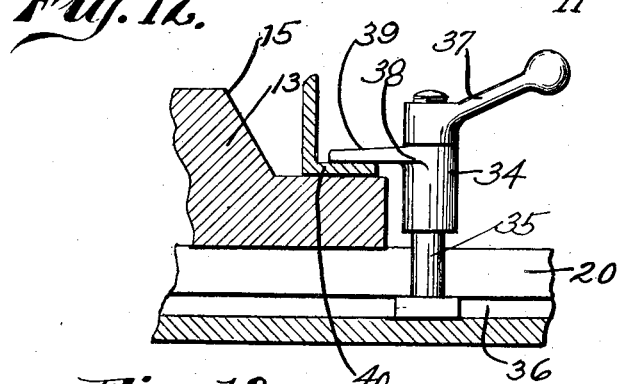
INVENTOR,  
George C. Martin;  
BY  
Blakeslee & Brown  
ATTORNEYS.

Patented Aug. 17, 1926.

1,596,203

UNITED STATES PATENT OFFICE.

GEORGE C. MARTIN, OF LOS ANGELES, CALIFORNIA.

PIPE-MAKING MACHINE.

Application filed January 21, 1924. Serial No. 687,490.

This invention relates to pipe-making machines, and particularly to machines adapted for the making of concrete and cement pipe, or for that matter, any form of pipe requiring a mold in the forming of the same.

The invention has for an object the provision of a pipe-making machine which will form pipe of different diameters or thicknesses. At the present time the ordinary type of machine for forming concrete or cement pipe, or in fact any type of pipe, adapted to be formed by a mold, of a plastic material, which plastic material is allowed to set, is adapted to form only one diameter of pipe, and different machines must be resorted to when pipes of other diameters are formed. With the limitations of the present type of machine in view, I have provided a universal machine which may be conveniently regulated right on the ground where the pipe is to be formed or made, and which does not entail extensive changes and only necessitates one machine with different sizes of forming molds to produce pipe of different diameters. The machine is devoid of complicated mechanism and does not require skilled labor to operate the same. A machine that only forms one diameter of pipe of necessity requires other machines for the forming of other diameters of pipe, and this entails great expense on the part of the owner of such machines, whereas, with my invention one machine is all that is necessary, with a few attachments which may be purchased as needed.

The invention has for a further object the provision of a machine which will form the pipe so that there will be practically no voids at different points in the pipe, with the result that the tensile or compressive strength of the pipe is the same throughout the pipe.

In practicing the invention I provide inner and outer molds within which is a packing head eccentric to the longitudinal axes of the molds. The packing head is associated with means for rotating the same, as is likewise the outer mold. Means is provided for gradually raising the inner mold and the packer head, as material such as neat cement or concrete is fed within the inner mold to be acted upon by the packer head. The cement or concrete is thrown into the annular space included between the outer surface of the inner mold and the inner surface of the outer mold by centrifugal force, due to the rotation of the packer head, and as the outer mold is constantly being rotated a pipe is gradually built up. Further means, of course, is provided for regulating the rate of ascent and descent of the packer head and the inner mold.

With the above and other objects in view, the invention consists in the novel and useful provision, formation, association and relative arrangement of parts, members and features, all as illustrated in certain of its embodiments in the accompanying drawings, described generally, and finally pointed out in claims.

In the drawings:

Figure 2 is a top plan view of the pipe forming machine shown in Figure 1;

Figure 3 is a fragmentary vertical sectional view on an enlarged scale, of one of the forming members, said view being taken on the line 3—3 of Figure 1;

Figure 4 is a diagrammatic view of the means for controlling the raising or lowering of the packer head and inner mold of the machine;

Figure 5 is a fragmentary view partly in section and on an enlarged scale looking directly within the mold members, said view being taken on the line 5—5 of Figure 7;

Figure 6 is a fragmentary cross sectional view showing means permitting rotation of the outer mold member, said view being taken on the line 6—6 of Figure 5;

Figure 7 is a fragmentary vertical sectional view of the mold members and packing head, taken on the line 7—7 of Figure 5;

Figure 8 is an enlarged fragmentary vertical sectional view of a bearing member through which a square shaft is passed for rotating the packer head;

Figure 9 is a perspective view of the outer mold;

Figure 10 is a top plan view of the mold shown in Figure 9;

Figure 11 is a fragmentary cross sectional view, on an enlarged scale, of clamping means for holding the top ring of the mold;

Figure 12 is a fragmentary view partly in section and on an enlarged scale, of means for centering the outer mold; and, Figure 13 is a fragmentary cross sectional view on an enlarged scale of a clamping element for holding the outer mold to the lower ring.

Corresponding parts in all the figures are designated by the same reference characters.

Figure 1:
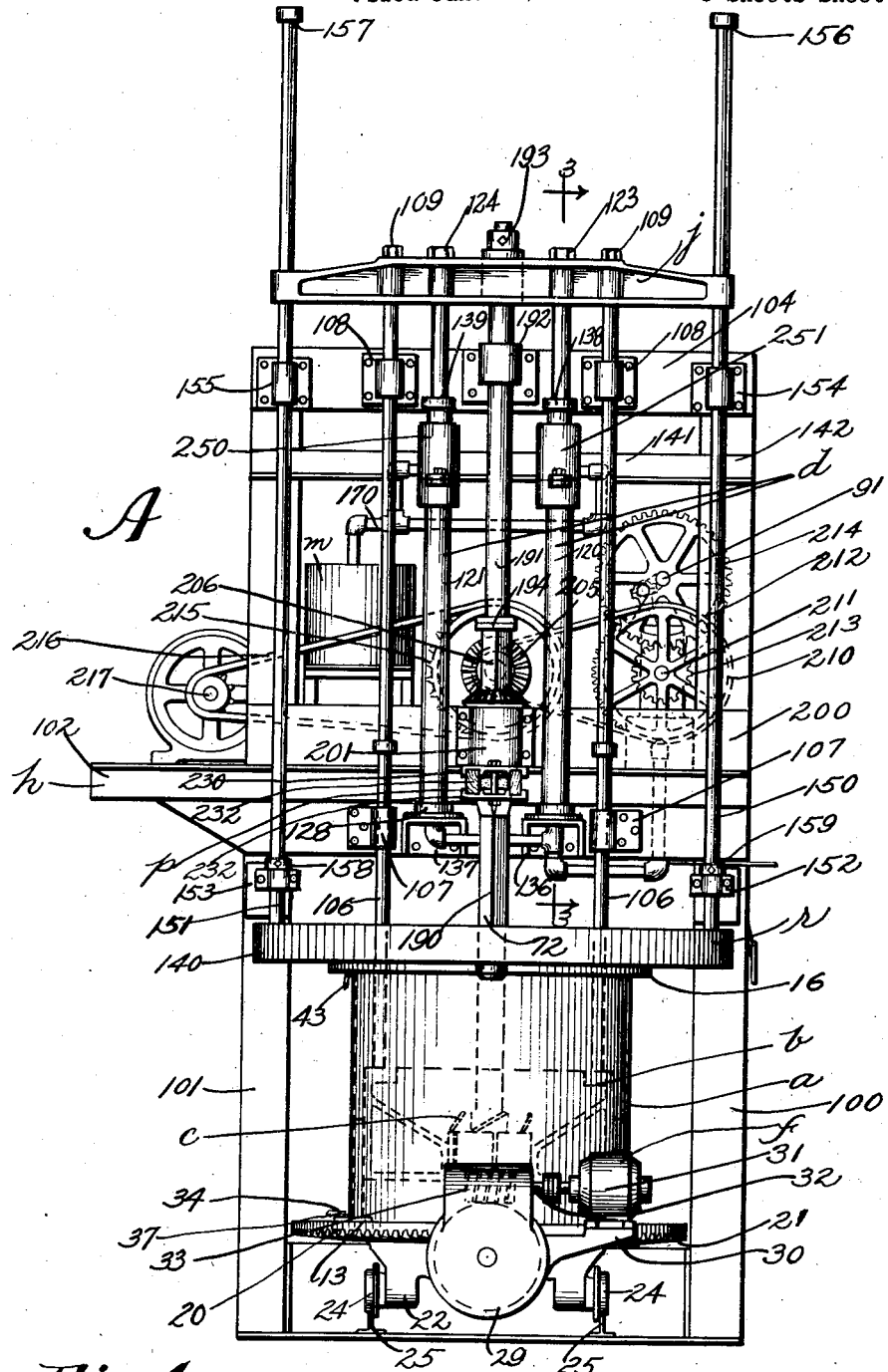
Figure 1 is a vertical elevation of the complete pipe forming machine.

Referring with particularity to the drawings, the improved pipe forming machine is designated as an entirety by A, and said machine includes an outer mold member a, an inner mold member b, a packer head c, and means d for controlling the raising and lowering of the inner mold b and the packing head c, and means e and f for rotating the packing head c and the outer mold respectively; all of which elements are used in practicing one embodiment of the invention.

Primarily the invention resides in the three elements a, b, and c, the other means being necessary adjuncts in the operation of such first named elements a, b and c. Reference to Figure 7 discloses an outer forming mold a which may be of the type shown in Figures 9 and 10. This mold a is so formed as to be easily detached from the formed pipe by operation of latching mechanism 1, which latching mechanism may include an arm member 2 associated with a shaft 3, which shaft in turn is carried by arms 4 joined with lugs 5 associated with one portion of the mold, as shown at 6. It will be noted that the mold is so formed as to have overlapping portions, as illustrated at 7 and 8, the part 8 being offset as shown at 9, to accommodate the part 7, so that the inner surface of such mold is substantially the same diameter at all points. A second series of lever arms 10 are provided, which arms are pivotally associated with the parts 7 of such mold, as shown at 11 and likewise with the shaft 3. Thus when the lever 2 is pulled directly outwardly the members 4 are rotated about the lugs 5 and the overlapped portions are caused to slide and thus expand the entire mold directly outwardly to increase its diameter and release the same from the formed pipe. It is likewise to be noted that retaining plate members 12 keep the overlapped portion 8 in close proximity to the overlap portion 7 of the mold. This mold a is adapted to rest on what may be termed a bottom ring 13 and said ring is flanged as shown at 14. This flange is provided with a tapered surface as shown at 15. The flange is adapted to internally flange one of the ends of the formed pipe. A top ring 16 is likewise provided and this ring is flanged as shown at 17 and likewise beveled as shown at 18. It is to be noted that the beveled portion 18 forms an exterior flange upon the formed pipe, as shown at 19. Thus the pipe ends may be joined by the exterior flange 19 entering and cooperating with the interior flange of the next adjacent pipe. This of course is usual practice. The bottom ring 13 may be supported upon a rotary table 20, which table is provided with teeth 21 on a surface thereof. A carriage member 22 is formed so as to accommodate roller members 23, which roller members in turn support the rotary table 20 and likewise permit its rotation relative to the carriage 22. If desired, the carriage may be conveniently mounted upon flanged wheels 24 which are adapted to ride on a trackway 25. A bevel gear 26 is adapted to have its teeth mesh with the teeth 21 of the rotary table, said carriage being journaled as shown at 27 for the reception of a shaft 28 upon which such bevel gear 26 is mounted. Likewise carried on the shaft 28 is a gear 29 and the carriage is provided with an extension 30 adapted to support and carry the means f which may comprise a motor 31, the shaft of which motor as shown at 32, is adapted to carry a worm gear 33, the teeth of which worm gear mesh with the teeth of the gear 29. It will thus be seen that the rotary table may be turned when the motor is in operation. The outer mold a is held locked to the rotary table by means of clamps 34 best illustrated in Figure 13, and in which it will be noted that the bolt portion 35 of such clamp is received in a T-shaped groove 36, the head of such bolt being received in the lateral portion of the T, and a tail nut 37 is adapted for screw-threaded engagement with the screw portion of the bolt so as to force a member 38 downwardly, which member 38 is provided with an extension 39 adapted to wedge the lower flange member 40 of the mold a, as well as the bottom ring between such extension 39 and the top surface of the table 20. The T-shaped groove, it is to be noted, extends radially inwardly of the rotary table, as shown in Figure 7 at 41. A series of such clamps within grooves may be provided for holding the mold and the bottom ring to the rotary table. The radial grooves allow adjustment inwardly or outwardly of the clamp members so as to tightly clamp various sizes of bottom rings and molds to the rotary table in the formation of pipes of different diameters. It is of course essential that the mold a should be properly centered with relation to the bottom ring; otherwise the internal flange would be incorrectly formed, and to this end the bottom rings of different diameters may be provided with lateral holes 42 within which members 43 may be placed so as to properly center the said mold as illustrated in Figures 5 and 7. The top ring 16 may be held to the mold a through the medium of the clamp 43 shown in Figure 11. It is of course understood that a series of such clamps 43 may be provided. This clamp or clamps 43 may be in the form of a toggle having two arms 44 and 45 and an intermediate arm 46, as is usual, all of which are pivoted to a lug member 47 associated with the mold a. The top ring 16 is provided with a series of transverse openings or slots 48 so that the head portion 49 of the lever 44 may be passed therethrough and then locked to such ring so as to clamp the ring to the mold when the arm 45 is revolved to the position shown in Figure 11. As stated, a series of such clamps are arranged around the mold.

The inner mold b likewise acts as a hopper for the directing of cement or other material to the packing head c, and the said member b is provided with a base member 60, a side wall 61 at right angles to such base portion 60, said side wall acting to form the inner surface of the pipe, and said side wall 61 presents a substantially curved surface from the zone 62 (see Fig. 5), to the point or zone 63 where the said surface curves radially inwardly, as shown at 64 and then is curved outwardly or given a reverse curve from that shown in 64 as shown at 65 to where it again joins the wall as shown at 62. It is to be noted that the curved portions 64 and 65 of such outer wall is substantially S-shaped, but the portion 65 of such wall is approximately a true arc so as to conform to the curvature of the packer head c. Reference to Fig. 7 shows the hopper or bin portion of the mold and which is formed by providing a wall 67 which ranges downwardly from the side wall 61 to the portion 65. As a matter of fact this wall 67 forms a part of the wall 65, it being noted in the showing that the parts of such member b are all integrally formed. The slope given such member tends to direct all material received within the mold b and upon the wall 67 directly downwardly toward the part 65.

The packer head c comprises in the showing smoothing blades 70 and propeller blades 71. Said packer head c is carried upon the shaft 72, an end portion of such shaft being received in a journal portion 73 of the base member 60 of the mold b. The smoothing blades 70 are adapted to contact with the inner surface of the pipe during its formation so as to smooth the same, while the blades 71 act to rapidly and with pressure throw by centrifugal force the cement or concrete or like substances against the inner surface of the outer mold a and the force with which it is thrown tends to form a homogeneous pipe. As stated, the member b along with the packer head c is gradually raised as the pipe is formed, the said packer head being driven or rotated in the direction shown by the arrow in Figure 7, as is likewise the member a. Whether or not the member a rotates in the same direction as the packer head apparently makes little difference, and the speeds of rotation of the two members are not necessarily the same. In other words, the member a is rotated at a speed proportionate to the feeding speed and quantity of neat cement or concrete received upon the bin or hopper portion of the member a to be acted upon by the packer head and thrown by centrifugal force against the inner surface of such member a. As the mold a is rotated that portion of the pipe which has been formed is likewise rotated so as to be smoothed by the outer surface 61 of the mold b and likewise smoothed by action of the blades 70.

The means d is so formed and constructed and inter-related with the parts to be described that the said packer head c as well as the inner forming mold b may be raised at any desired speed and lowered at will. It is of course understood that the mold b as well as the packer head c are lifted simultaneously and at the same rate of speed of ascent or descent. As constituting such means d I provide a pump member g which may be of conventional form having one or more cylinders, as shown at 90 within which are pistons, not shown, the piston arms being associated with a crank shaft, as shown at 91, which crank shaft is turned by means of the motor e through various cooperating elements to be described. It is to be noted that the means e likewise rotates the packer head c. In the mounting of such elements e and g it is to be noted that the device as an entirety, A, includes an upright frame member which includes two pedestal portions 100 and 101 spaced apart to permit the carriage 22 including the rotary table 20 to be passed therebetween and the track-way 25 is so arranged as to pass between the said pedestal members for this purpose. It is of course understood that the pedestal members may be arranged in cooperating parallel pairs spaced apart so as to add rigidity to the entire frame structure and likewise to support the various mechanisms for actuating and moving the packer head and inner mold member by providing a platform h attached to and carried by such pedestal members as shown in Figure 1. This platform may comprise angle iron frame members 102 upon which is supported a top-piece 103 constituting a part of the platform and to which topping piece the motor e may be bolted as shown in Figure 2. The pedestal members 100 and 101 extend upwardly and beyond the said platform h, as shown in Figure 1 and at their upper reaches or terminal portions there is a transverse frame member 104 joined therewith. The inner mold member is provided with inwardly extending lugs 105 and rods 106 are joined with such lugs and then extend upwardly, as shown in Figure 1. Said rods are guided and held to the frame member by means of guides 107 and 108 joined to the platform member h and the transverse frame member 104 respectively. A cross head j is bored so as to permit passage of the said rods 106 therethrough to where such rods may be bolted to such cross head, as by means of nuts shown at 109. It thus follows that if the cross head were moved upwardly the inner mold would be raised, or lowered if the cross head were moved downwardly. The means $d$ is illustrated on an enlarged scale in Figure 3 wherein it will be seen that the said means for raising and lowering the mold $b$ as well as the packer head $c$, includes elongated cylinders 120 and 121 within which are pistons 122. Said piston are elongated and joined with the cross head $j$, as shown at 123 and 124. The piston heads are provided with packing rings 125 and 126 so as to ensure close working fit between the inner surface of the cylinders and the piston heads. Cylinder heads 127 and 128 are provided for the cylinders 120 and 121 respectively and said cylinder heads are identical in form, and therefore said cylinder head 127 will be described.

Referring to Figure 3 the said head includes a plate 129 having an upright annular flange 130 provided with screw-threads 131 so that said flange may have a screw-threaded engagement with the screw-threaded portion 132 of the cylinder 120. The opposite surface of the plate 120 is likewise provided with an annular flange 133 which is externally screw-threaded as shown at 134. It will be noted that the annular opening in such flange is likewise extended through the plate 129, and therefore permits communication with the interior of the cylinder 120. The said plate 129 may be provided with transverse bores through which bolts 135 may be passed so as to bolt the said cylinder head, considered as an entirety, to a bracket member 136. Attention is directed to the fact that the cylinder head 128 is likewise carried on a bracket member 137 and in a manner identical with the cylinder head 127. The said bracket members 136 and 137 are carried by the platform member $h$. The opposite end of each cylinder carries gland nuts 138 and 139. Glands or packing members 140 within such nuts bear against the periphery of the piston members so as to ensure a fluid-tight fit therebetween. A transverse frame member 141 is joined to the pedestal members as shown at 142, and secured to such frame member are valve members 250 and 251. The said valve member 251 is illustrated in Figure 3 and as the valve member 250 is identical with such valve 251 the valve 251 will be described. Said valve includes a base member 252 having an annular cup portion 253 through the annular opening of which as shown at 254 the cylinder 120 is passed. The annular opening of such cup portion is enlarged at the zone marked 255 so as to confine a packing gland 256 between such cup at the zone marked 255 and the periphery of the cylinder 120. The base 252 is provided with extensions 257 and 258, the extension 258 being joined with the frame member 141. A valve housing is shown at 259 and is provided with a flanged base 160 adapted to be carried by the base 252, such base 160 being transversely bored so that bolts may be passed through such bores and through transverse threaded bores in the extensions 257 and 258 of the base 252. The head 161 of the housing 259 is annular in form to permit passage of the cylinder 120 therethrough. The wall 162 of such housing 259 is spaced from the periphery of the cylinder 120, and integrally formed or otherwise associated with the housing and within the housing are downwardly extending annular flanged members 163 and 164 which are spaced apart and the annular openings in the same are of a size sufficient to permit passage of the cylinder 120 therethrough. It is to be understood, however, that the cylinder 120 does not move, and that where the words "passage of the cylinder therethrough" occurs it is meant that a close working fit or engagement exists between the periphery of such cylinder and the member surrounding the same. The said cylinder is provided with a series of transverse bores 165 which permit communication with the interior of the cylinder and the interior of the housing 259, and particularly the zone of such housing marked 166. The two flanged members 163 and 164 aid in preventing any fluid loss along the periphery of the cylinder from the zone of the housing marked 166. A pipe 170 (see Fig. 4) carries a T 171 and an elbow 172 with suitable connections 173 and 174, which connections communicate with the interior of the valves 250 and 251, and particularly the zone marked 166 of each valve, it being remembered that the valve 250 is identical in form with the described valve 251.

A reservoir tank $m$ adapted to confine a liquid such as oil, is in communication with the pipe 170, as shown by the pipe including elbow connections at 180 and said tank likewise communicates with the pump $g$ through suitable pipes 181. A pipe line 182 communicates with a second portion of the pump $g$ and with the cylinder heads 127 and 128. There is also a pipe 183 in communication with the tank $m$ and the pipe 182 and particularly that portion of the pipe 182 included between the pump $g$ and the cylinder head 127. A valve 184 is interposed in the pipe 183, and a lever 185 controls the opening or closing of such valve.

The packing head $c$, as stated, is associated with a shaft 72, which shaft is squared for a length thereof, as shown at 190, and then rounded again as shown at 191 with the said rounded portion 191 received and carried within a journaled bracket 192 joined with the frame member 104, the terminal portion of such rounded portion 191 being carried by the cross head $j$ by suitable means, as shown at 193. The zone of change between the squared portion of the shaft and the rounded portion 191 may be enlarged to form a flange, as shown at 194. A frame member 200 carries a journalled bracket 201 adapted to confine within its journaled portion a bevel gear and its shank 202. The opening 203 in such bevel gear is squared to permit passage of the squared portion 190 of the shaft 72. Anti-friction means 204 may be interposed between the bevel gear and its shank and the journal bracket 201. A bevel gear 205 has its teeth in mesh with the teeth of the bevel gear 202, and said bevel gear 205 is mounted upon a shaft 206 which is at right angles to the shaft 72. The said shaft 206 is suitably supported in bearing brackets 207, which brackets are carried on the platform $h$. A sprocket wheel 208 is mounted upon a sleeve shaft 209, and a sprocket wheel 210 is mounted upon a shaft 211. There is a continuous chain 212 passed over the periphery of the sprocket wheels 208 and 210. Likewise mounted upon the shaft 211 is a gear 213, the teeth of which are adapted to mesh with a gear 214 of greater diameter than the gear 213, and the gear 214 is mounted upon the crank shaft 91 so as to be rotated when the crank shaft is rotated. Likewise mounted upon the sleeve shaft 209 is a sprocket wheel 215, and a sprocket belt 216 is passed over such sprocket wheel 215 and a sprocket wheel 217 mounted on the shaft of the motor $e$. It is noted that the sprocket wheel 215 is of greater diameter than the sprocket wheel 217. A clutch member $o$ is formed to control the rotation of the shafts 206 and 209 at the will of the operator. Such clutch may include the usual operating arm 218 controlling movement of a collar 219 carried on the shaft 206, which collar is associated with a drum which may or may not form a part of the gear 215, as shown at 220. Movement of the arm 218 in one direction will release the sleeve shaft 209 from the shaft 206 and movement in a second direction will couple the two so that such shaft 206 may be rotated, due to rotation of the sleeve shaft 208. In this connection it is to be noted that the motor $e$ through the clutch may rotate the drum thereof continuously and the pump element $g$ be inoperative, as would be the shaft 72.

In the embodiment of the invention shown I provide what is known as a scraper member $p$ which includes two plate members 230 and 231, spaced apart, with wooden members 232 interposed therebetween, and adapted to bear against the periphery of the squared portion 190 of the shaft 72 (see Fig. 8). Carried by the lowermost plate member 231 is a series of scraper members 233 adapted to have contact with the periphery of the squared portion of the shaft 72. The purpose of this scraper member is to remove such substances as concrete or cement or the like from a shaft so as to not in any way clog the bearing surfaces through movement of the shaft therethrough. The wood acts as an absorber of moisture and it is noted that the plate members are flanged as shown at 234 and 235 to retain the wooden members in position between such plates.

It is essential when the machine as a whole is in operation with the outer mold being rotated, that the mold be guided at its upper end so as to not wobble, and this is accomplished by providing the means $r$ which includes a guide ring 140 which is flanged inwardly as shown at 141, the flanged portion being slotted at spaced points as shown at 142. Roller members 143 mounted on shafts 144 are carried by the flanged member 141, the shafts 144 of such roller members being received within the slots 142. Spaced plate members 145 and 146 are carried by the shafts 144 and on opposite surfaces of the flange 141. Thus if the nuts 147 which have a screw-threaded engagement with the shafts 144 are loosened, the plate members 145 and 146 will permit a slight adjustment of the position of the shafts within the slot 142. This adjustment of course permits for adjustment of the roller members. Thus the roller members are so adjusted as to have contact with the periphery of the upper ring 16 associated with the mold $d$. The guide ring 140 is supported by means of rods 150 and 151, which rods are diametrically arranged and carried within journaled brackets 152 and 153 associated with the members 100 and 101 for one part, and with journaled brackets 154 and 155 carried by the member 104. The cross head $j$ is provided with transverse bores at its ends so as to permit passage of the rods 150 and 151 respectively therethrough. The upper end of each of such rods is provided with a flange member, as shown at 156 and 157. Lock collars 158 and 159 are carried by each of the rods 150 and 151.

The operation of machine is as follows:
Assume that it is desired to form a given diameter of pipe made from some material such as concrete, and having selected the proper diameter of outer mold and having determined the proper thickness of the pipe, I then provide a given diameter of inner mold substantially as shown by the mold $b$. However, I mount the outer mold member on the rotary table 20, carried on the car carriage and as shown in Figure 7. Said mold is provided with upper and lower ring members to properly form flange ends in the pipe to be formed by the device. The car carriage carries its own motor for revolving the rotary table, which of course would in turn revolve the outer mold.

Reference to Figure 4 shows diagrammatically the means for raising or lowering the piston members within the cylinders, and it is to be noted that the valve 184 may be opened or closed through the medium of the lever 185. Movement of the lever 185 in one direction permits oil or other fluid to be drawn from the tank through the pump and thence through the pipe 183 back to the tank, while movement in a second direction forces oil from the pump into the cylinder heads to raise the pistons within such cylinders. The pistons, as stated, are associated with the cross head $j$ and if the valve is closed oil or other fluid will lift the pistons at a speed depending upon the rate of speed of pumping action of the pump $g$, as well as whether or not the valve 184 is completely closed or partially open, so as to divide the path of flow of the fluid. As the pistons are raised, the cross head is raised and as the shaft 72 is connected with such cross head in a journaled bearing, said shaft will be raised. The inner mold member is connected with the cross head $j$ through the medium of the rods 106. The oil is pumped into the cylinders so as to completely raise the pistons up to a point where oil may escape back through the port openings 165 in the cylinders and into the valve members and from such members back through the pipe 180 to the tank. Prior to the piston heads reaching the valve members the cross head $j$ will contact with the flanges 156 and 157 and lift the guide ring member 140 upwardly. It will be noted that the parts are so arranged that the base portion of the inner mold member will be approximately even with the base portion of the ring member 140 when the cross head $j$ contacts with the flanges 156 and 157. This ensures that all parts will be lifted an equal distance. As stated, when the piston members reach the valves the oil or other fluid is allowed to return to the tank, the pump by the pressure exerted holding the pistons elevated, and the car with its mold is then run under and between the pedestal members 100 and 101 and then locked in position by any suitable means such as shown at 300 and 301. It is of course understood that the car with its mold is so positioned as to be concentric with the inner mold. The valve 184 is then opened in adjusted amounts according to movement of the lever 185 and the weight of the various elements such as the cross head $j$, the rods and the inner mold with the packer head, will force oil or other fluid contained within the cylinders back through the pipe 182 and into the valve, and thence through the pipe 183 into the tank. During this time the pump $g$ will likewise be forcing oil back through the valve and the pipe 183 into the tank. Consequently a nicety of balance may be maintained and the inner mold and the packer head lowered at adjusted speeds. The inner mold $b$ is lowered sufficiently to have the base thereof adjacent on the upper surface of the rotary table, and it is noted that the periphery of such mold will be in exact alignment with the inner surface of the bottom ring member 13. At this point the guide ring member 140 will have the roller members 143 carried thereby adjacent the periphery of the upper ring member 16; movement of such guide ring beyond an adjusted point being regulated by the lock nuts 158 and 159 through their contact with the brackets 152 and 153. The rollers may then be adjusted so as to have portions of their peripheries in engagement with a portions of the periphery of the upper ring member so as to steady the upper extremity of the mold when the mold is in rotation. The motor 31 may then be fed current so as to cause the shaft of same to rotate, which in turn will rotate the outer mold member through the medium of rotation of the rotary table to which such mold is attached, and the shaft 72 may commence its rotation by throwing in the clutch $o$. Concrete or other plastic substances forming the pipe is then poured into the inner mold so as to contact with the hopper portion thereof, being the inclined plate 67, which will direct the material to the packer head $c$. The blades 71 of such packer head rapidly throw with great force the material against the inner surface of the outer mold, and as such mold is rotating at a given rate of speed the pipe will be formed between the periphery of the inner mold and the inner surface of the outer mold. The blade portions 70 of the packer head tend to smooth the inner surface of the pipe during its formation. Figures 5 and 7 show that the wall 61 is interrupted at the zone or curve marked 64, but that the wall portion thereof at this point extends straight upwardly, as shown at 350 so that the filling of the hopper portion of the inner mold $b$ will, due to the arrangement of this mold, at all times direct the pipe forming material to the packer head $c$. As the pipe is formed the valve 184 is so controlled as to gradually raise the inner mold and of course the packer head $c$, and the pipe will be left standing substantially as shown in Figure 7. The periphery of the inner mold will tend to smooth the inner surface of the pipe, and as stated, the outer mold $a$ is being rotated and this rotation will of course cause the formed pipe to rotate in step with such outer mold. A flange will be formed substantially as shown in Figure 7 by the general shape of the lowermost ring member 13. The pipe will be closely formed and without voids, due to the packing action or centrifugal force exerted on the material forming the pipe through the medium of the packer head c. Gradually the pipe which is designated by B will be built up until the upper ring member is reached, whereupon a flange will be formed by such upper ring member in the pipe. The inner diameter of such upper ring member is just sufficient to allow clearance of the periphery of the inner mold member therethrough. After the upper ring member has been cleared a certain distance, the piston members will have reached the valve members, whereupon the inner mold, packer head, and the guide ring member 140 will be above the upper ring member so that upon releasing the locks 300 and 301 the car may be moved from its position beneath the device A. Having determined the setting period of the formed pipe B the outer mold may then be released therefrom by revolving the arm 2 shown in Figures 9 and 10 so as to cause the parts 7 and 8 to slide, whereupon the outer mold may be lifted from such pipe. It is of course understood that the upper ring member would be first lifted from the pipe by releasing the clamp members shown in Figure 11. Thus I might provide a series of cars on tracks, each having or containing a rotary table, or I might provide a single car and upon lifting the formed pipe from the rotary table by lifting the lowermost ring member with some means such as block and tackle, other pipe may be formed. For different diameters of pipe it is only necessary to vary the diameters of the outer mold member and the inner mold member and then change the position of the car when it is passed under and between the pedestal members 100 and 101. With relation to any inner mold the packer head would always be the same; that is, in an off-set position or eccentric to the outer and inner molds. The proximity of the packer head to the point of performing work ensures a close packing of the material forming the pipe, and in the showing the blades 70 of such packer head tend to smooth the inner surface of the pipe during its formation.

It is obvious that various changes and modifications may be made in practicing the invention, in departure from the particular showing of the drawings, without departing from the true spirit of the invention.

Having thus disclosed my invention, I claim and desire to secure by Letters Patent:

1. In a pipe-making machine, the combination, of two concentric molds forming between them an annular space into which space pipe forming material is forced, and means eccentric to the longitudinal axis of said concentric molds for forcing the pipe forming material into said annular space.

2. In a pipe-making machine, the combination, of an outer mold, an inner mold, said molds forming between them an annular space, and means for forcing material within such annular space; said means comprising a member adapted to be rotated to force the pipe-forming material into said annular space by centrifugal force.

3. In a pipe-making machine, the combination, of an outer mold, an inner mold, said molds forming between them an annular space, and means for forcing material within such annular space; there being means for rotating said outer mold.

4. In a pipe-making machine, the combination, of an outer mold, an inner mold, said molds forming between them an annular space, means for forcing material within such annular space, and means for raising or lowering said inner mold as the pipe is formed.

5. In a pipe-making machine, the combination, of an outer mold, an inner mold, said molds forming between them an annular space, means for forcing material within such annular space, means for raising or lowering said inner mold as the pipe is formed, and further means for rotating the outer mold during the forming of the pipe.

6. A pipe-forming machine, including an outer annular mold, an inner mold concentric with the outer annular mold, said inner mold being formed with a hopper portion adapted to direct material for the forming of a pipe to a space included between the outer mold and the inner mold.

7. A pipe-forming machine, including an outer annular mold, an inner mold concentric with the outer annular mold, said inner mold being formed with a hopper portion adapted to direct material for the forming of a pipe to a space included between the outer annular mold and the inner mold; there being a rotatable packer head within the inner mold, said hopper directing the material for forming the pipe to such packer head.

8. A pipe-forming machine, including an outer annular mold, an inner mold concentric with the outer annular mold, said inner mold being formed with a hopper portion adapted to direct material for the forming of a pipe to a space included between the outer annular mold and the inner mold; there being a rotatable packer head within the inner mold, and said hopper directing the material for forming the pipe to such packer head, and means for rotating such packer head.

9. A pipe-forming machine, including an outer annular mold, an inner mold concentric with the outer annular mold, said inner mold being formed with a hopper portion adapted to direct material for the forming of a pipe to a space included between the outer annular mold and the inner mold; there being a rotatable packer head within the inner mold and said hopper directing the material for forming the pipe to such packer head, and means for rotating the outer annular mold.

10. A pipe-forming machine, including an outer annular mold, an inner mold concentric with the outer annular mold, said inner mold being formed with a hopper portion adapted to direct material for the forming of a pipe to a space included between the outer annular mold and the inner mold; there being a rotatable packer head within the inner mold and said hopper directing the material for forming the pipe to such packer head, and means for rotating the outer annular mold; further means being provided for rotating the packer head.

11. A device of the character disclosed, including an inner mold member formed with a hopper portion.

12. A device of the character disclosed including a mold having a base portion and side wall a portion of which is given a reverse curvature.

13. A device of the character disclosed, including a mold having a base portion and side wall a portion of which is given a reverse curvature; there being likewise a sub-base member inclined downwardly from the side wall toward a portion of the reverse curve of such side wall.

14. A device of the character disclosed, including a mold having a base portion and side wall a portion of which is given a reverse curvature; there being likewise a sub-base member inclined downwardly from the side wall toward a portion of the reverse curve of such side wall; in combination with a packer head adapted to be confined within a portion of such reverse curved portion of the side wall of the mold.

15. A device of the character disclosed, including a mold having a base portion and side wall a portion of which is given a reverse curvature; there being likewise a sub-base member inclined downwardly from the side wall toward a portion of the reverse curve of such side wall; in combination with a packer head adapted to be confined within a portion of such reverse curved portion of the side wall of the mold; there being an outer mold within which the first named mold is received, material for forming a pipe being received within the first mold and directed to the packer head by the inclined sub-base to be centrifugally forced between the first named mold and the outer mold when the packer is rotated.

16. A device of the character disclosed, including a mold having a base portion and side wall a portion of which is given a reverse curvature; there being likewise a sub-base member inclined downwardly from the side wall toward a portion of the reverse curve of such side wall; in combination with a packer head adapted to be confined within a portion of such reverse curved portion of the side wall of the mold; there being an outer mold within which the first named mold is received, material for forming a pipe being received within the first mold and directed to the packer head by the inclined sub-base to be centrifugally forced between the first named mold and the outer mold when the packer head is rotated, and means for raising said first named mold and said packer head as the pipe is formed.

17. A device of the character disclosed, including a mold having a base portion and side wall a portion of which is given a reverse curvature; there being likewise a sub-base member inclined downwardly from the side wall toward a portion of the reverse curve of such side wall; in combination with a packer head adapted to be confined within a portion of such reverse curved portion of the side wall of the mold; there being an outer mold within which the first named mold is received, material for forming a pipe being received within the first mold and directed to the packer head by the inclined sub-base to be centrifugally forced between the first named mold and the outer mold when the packer head is rotated; means for raising said first named mold and said packer head as the pipe is formed, and means for rotating the outer mold.

In testimony whereof, I have signed my name to this specification.

GEORGE C. MARTIN.